UNITED STATES PATENT OFFICE.

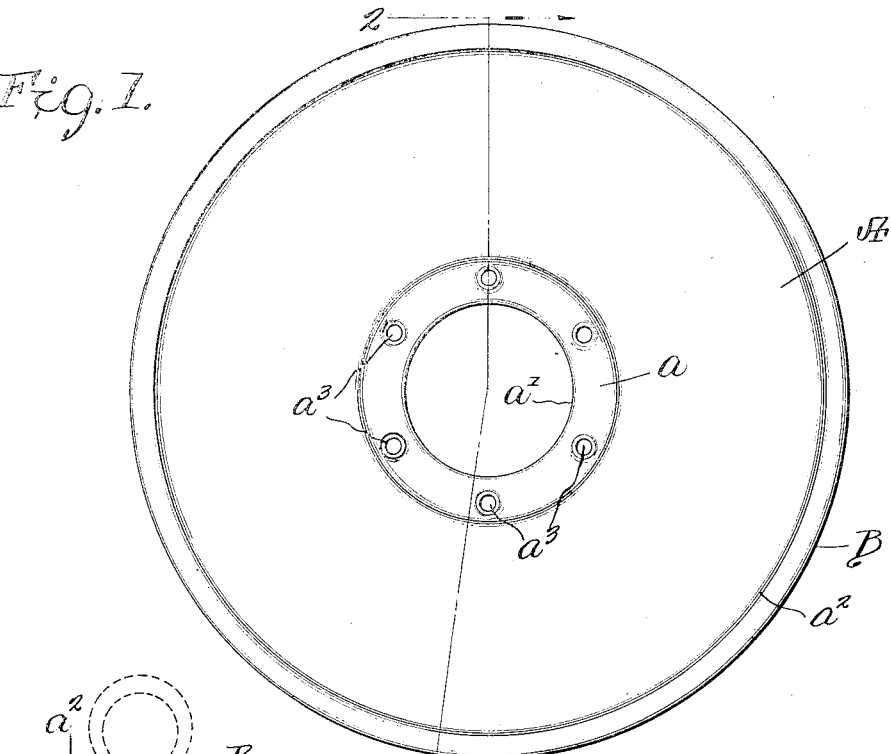
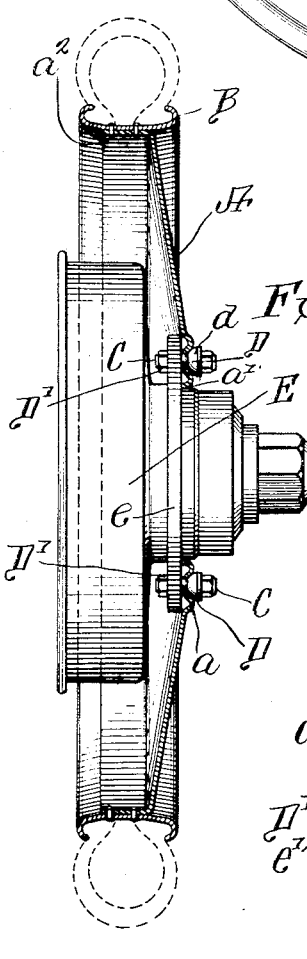
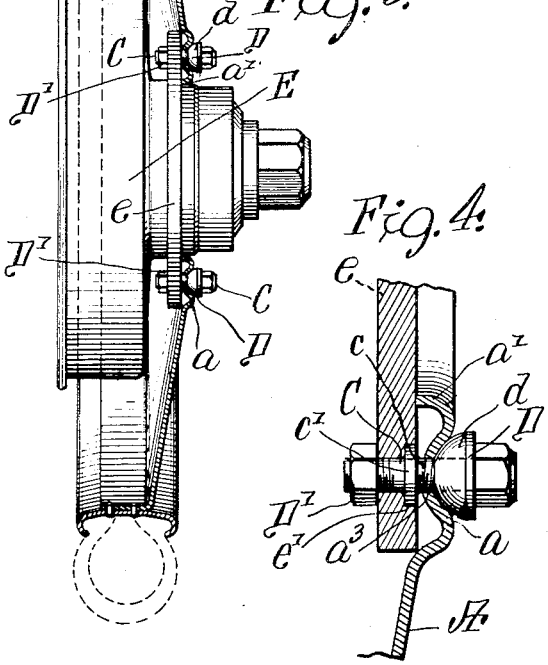
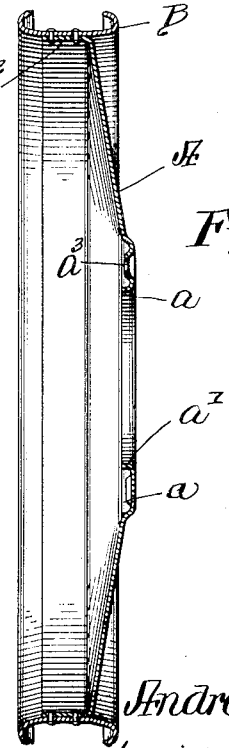

ANDRÉ JULES MICHELIN, OF PARIS, FRANCE, ASSIGNOR TO MICHELIN & CIE., OF CLERMONT, FERRAND, FRANCE, A CORPORATION OF FRANCE.

DEMOUNTABLE WHEEL.

1,376,390. Specification of Letters Patent. Patented Apr. 26, 1921.

Application filed May 21, 1919, Serial No. 298,644. Renewed June 3, 1920. Serial No. 386,325.

*To all whom it may concern:*

Be it known that I, ANDRÉ JULES MICHELIN, a citizen of the French Republic, residing at Paris, France, have invented certain new and useful Improvements in Demountable Wheels; and I do hereby declare the following to be a full, clear, and exact description of the invention, such as will enable others skilled in the art to which it appertains to make and use the same.

My present invention relates to improvements in vehicle wheels, and more especially to vehicle wheels with pneumatic, rubber, or other resilient tires, such as are used on automobiles, auto trucks, and the like.

The invention consists primarily in providing a wheel with a detachable annular web plate carrying on its outer periphery a suitable rim, and adapted to be detachably connected at this inner periphery to the hub of the wheel. The web plate is preferably made of resilient metal, such as steel.

The web plate is in the form of a truncated cone, so as to secure a suitable resiliency of the metal plate against radial strains, and also to increase the resistance of the plate against lateral deformation.

The web plate is detachably connected to the hub by suitable fastening devices, such as bolts and nuts, so that the web plate carrying the tire may be readily applied to or removed from the hub of the wheel as desired; and these fastening bolts are so arranged in connection with the web plate that they will tend to tighten or set up instead of becoming loose while the vehicle on which the wheel is mounted is in motion, as will be hereinafter described.

My invention will be more clearly understood after reference to the accompanying drawings, in which similar parts are indicated by similar reference symbols throughout the several views, and in which:

Figure 1 is a side elevation showing the web plate detached from the hub, with the rim secured thereto, but with the tire omitted.

Fig. 2 shows a section along the broken line 2—2 of Fig. 1, and looking in the direction of the arrows.

Fig. 3 shows the hub of the wheel in elevation, with the web plate and rim in section attached thereto, the tire being shown in dotted lines; and Fig. 4 is a sectional view, on a larger scale, showing the means of securing the disk to the hub.

A represents the web plate which is in the form of a disk pressed, stamped, spun, or otherwise shaped in any convenient or preferred way. This disk is dished outward, as shown in Figs. 1 and 3, and its central portion is provided with an annular hollow rib $a$, substantially U-shaped in cross section terminating on the inside in the flange $a'$ adapted to fit over the shoulder on the hub, as will be hereinafter described.

The outer edge of this disk A is flanged, as at $a^2$, to form a support for the rim B which may be made of a single piece, as shown, or of any other suitable type of rim such as the various well known demountable rims, now in use.

The outer wall of the hollow rib $a$ is provided with a series of symmetrically arranged holes $a^3$ surrounded by annular sockets, preferably in the form of zones of spheres, which sockets are adapted to receive the correspondingly shaped bosses $d$ of the nut D screwed on the fastening bolts C, which bolts pass through the annular flange $e$ on the hub E, and have their inner ends screw-threaded to engage the nuts D', which should be securely locked in place in any convenient way.

The bolts C are each provided with an annular flange $c'$, which engages in a socket $e'$ in the flange $e$, as shown in Fig. 4.

The bolts C are also screw-threaded, as at $c$, to engage the nuts D, and the direction of these screw threads $c$ is such that the turning of the wheel, as in ordinary use on the road, will tend to tighten said nuts on said bolts. This can very readily be provided for by having the screw threads $c$ right-handed for the right wheels of the vehicle, and left-handed for the left wheels of the vehicle, which is the reverse of the practice with the ordinary axle nuts.

By having the web plates provided with a U-shaped hollow rib $a$, as shown, that portion of the plate is strengthened, as at the same time resilient bearings are provided for the spherical bosses $d$ of the nuts D. This resiliency of the bearing will cause the web plate to bind against the bosses $d$, and any turning of these nuts on the bolts C will tend to increase this binding effect.

At the same time the fastening bolts C may be readily removed, by using a suitable wrench, whenever it is desired to remove the web plate and the parts carried thereby.

Having thus described my invention, what I claim and desire to secure by Letters Patent of the United States is:

1. In a wheel, the combination with a hub provided with a flange thereon, of an annular dished web plate provided at its inner periphery with a hollow annular rib adapted to register with said flange, the outer wall of said rib being provided with concave sockets, screw-threaded fastening bolts passing through said flange and said sockets, and nuts having convex bosses fitting in said sockets and engaging the screw threads on said bolts, substantially as described.

2. In a wheel, the combination with a hub provided with a flange thereon, of an annular dished web plate flanged at its outer edge, with a rim adapted to hold a tire secured to said flanged portion, said web plate being provided at its inner periphery with a hollow annular rib adapted to register with said flange on the hub, the outer wall of said rib being provided with concave sockets in the form of zones of spheres, screw-threaded fastening bolts passing through said flange on the hub and said sockets, and nuts having convex bosses fitting in said sockets and engaging the screw threads on said bolts, substantially as described.

3. In a wheel, the combination with a hub provided with a flange thereon, of an annular dished web plate provided at its inner periphery with a hollow annular rib adapted to register with said flange, the outer wall of said rib being provided with concave sockets, screw-threaded fastening bolts passing through said flange and said sockets, and having flanges thereon engaging recesses in the flange on the hub, and nuts having convex bosses fitting in said concave sockets and engaging the screw threads on said bolts, substantially as described.

4. A removable web plate adapted for use in wheels of the character described, comprising an annular dished metal plate flanged at its outer periphery to support a rim and provided at its inner periphery with a hollow annular rib, the outer wall of said rib being perforated and provided with concave sockets surrounding said perforations, substantially as described.

5. A removable web plate adapted for use in wheels of the character described, comprising an annular dished metal plate having means at its outer periphery to support a rim and pressed out near its inner periphery to form a series of concave projections each provided with a central perforation, in combination with a hub having an annular flange, screw-threaded fastening bolts passing through said flange and said perforated projections, and nuts having convex bosses fitting in the hollows of said projections and engaging the screw threads on said bolts.

6. In a wheel, the combination with a hub provided with a flange thereon, of an annular dished web plate provided at its inner periphery with a hollow annular rib, having openings therethrough, said hub flange spanning across the hollow of said rib when said web plate is applied against said flange whereby said web plate bears against said flange only at points on opposite sides of the hollow of said rib, screw-threaded fastening bolts passing through said flange and the openings in said rib, and nuts engaging the screw threads of said bolts to secure said plate and flange together.

In testimony whereof, I affix my signature.

ANDRÉ JULES MICHELIN.